US008058812B2

(12) United States Patent
Negrete

(10) Patent No.: US 8,058,812 B2
(45) Date of Patent: Nov. 15, 2011

(54) BUCK-MODE BOOST CONVERTER WITH REGULATED OUTPUT CURRENT

(75) Inventor: Michael George Negrete, Mountain View, CA (US)

(73) Assignee: Linear Technology Corporation, Milipitas, CA (US)

( * ) Notice: Subject to any disclaimer, the term of this patent is extended or adjusted under 35 U.S.C. 154(b) by 421 days.

(21) Appl. No.: 12/421,126

(22) Filed: Apr. 9, 2009

(65) Prior Publication Data

US 2010/0259192 A1    Oct. 14, 2010

(51) Int. Cl.
*H05B 37/02* (2006.01)
(52) U.S. Cl. ........ 315/224; 315/225; 315/299; 315/301; 315/308
(58) Field of Classification Search .............. 315/209 R, 315/224, 225, 246, 291, 299, 301, 307, 308
See application file for complete search history.

(56) References Cited

U.S. PATENT DOCUMENTS

| 7,274,183 | B1 | 9/2007 | Gu et al. | |
|---|---|---|---|---|
| 7,388,359 | B1 | 6/2008 | Ling | |
| 7,880,400 | B2* | 2/2011 | Zhou et al. | 315/247 |
| 7,888,881 | B2* | 2/2011 | Shteynberg et al. | 315/291 |
| 7,928,670 | B2* | 4/2011 | Chen et al. | 315/308 |
| 2007/0229001 | A1* | 10/2007 | McIntosh et al. | 315/307 |
| 2007/0257861 | A1 | 11/2007 | Zhang et al. | |
| 2010/0181925 | A1* | 7/2010 | Ivey et al. | 315/224 |

OTHER PUBLICATIONS

Linear Technology. Constant-Current/Constant-Voltage 1.4MHz Step-Up DC/DC Converter. LT1618. 16 pages 2001.
Linear Technology. 16 Channel Buck Mode LED Driver. LT3595. 16 pages. 2007.
National Semiconductor Corporation. 350 mA, Constant Current Output Floating Buck Switching Converter for High Power LEDs. Jan. 21, 2009. 16 pages. Retrieved from the Internet: <URL:http://national.com>.
European Patent Application No. 10159567.6. 2010. Buck-Mode Boost Converter With Regulated Output Current. Extended European Search Report, dated Jul. 16, 2010.
Linear Technology Corp. 2007. LT3595: 16 Channel Buck Mode LED Driver. Linear Technology Corporation Datasheet, No. LT0807, pp. 1-16 (Retrieved from the Internet: URL:http//www.datasheetdir.com/LT3595+download).
Szolusha, K. 2007. 16-Channel LED Driver Drives Up to 16 White LEDS with 5000:1 PWM Dimming. In Linear Technology Magazine, Oct. 2007, pp. 6-9. (Retrieved from the Internet: URL:http://cds.linear.com/docs/LT%20Magazine/LTMag-V17N03-02-LT3595-Szolusha.pdf).

* cited by examiner

*Primary Examiner* — Thuy Vinh Tran
(74) *Attorney, Agent, or Firm* — McDermott Will & Emery LLP

(57) ABSTRACT

An LED driver circuit that includes a buck-mode boost converter that provides a regulated output current and that requires only a single connection to each channel of LEDs. The buck-mode boost controller may include a current regulator that includes an integrator. The current regulator may be configured to integrate a difference between a reference signal that is representative of the desired level of the average current through the electronic power switch and a detected signal that is representative of the actual current that is being delivered to the buck-mode boost circuit through the electronic power switch. The reference signal to the integrator may not change during operation of the buck-mode converter. The current regulator may be configured to deactivate the integrator and/or to disconnect the detected signal from the integrator while the electronic power switch is off.

24 Claims, 4 Drawing Sheets

BUCK-MODE BOOST CONVERTER WITH REGULATED OUTPUT CURRENT

BACKGROUND

1. Technical Field

This disclosure relates to power switching converters and to LED driver circuits.

2. Description of Related Art

Various loads may be driven with a regulated current. LED lights, for example, may be illuminated by driving them with a regulated current. This regulated current may be provided by a power switching converter which converts a setting of a control into a proportional driving current, such as a dimmer or other type of control.

A buck-mode boost converter may be used as the power switching converter. Two or more connections between each channel of LEDs and the buck-mode boost converter may be required in order for the converter to detect the amount of current in LEDs and, in turn, to accurately regulate this current.

A single monolithic package may be used to separately control the current that is delivered to several channels of LEDs. The number of connection pins to the monolithic package may be limited by its size and governing standards. The number of LED channels which the monolithic package can control may therefore be limited by the number of required connections to each LED channel.

SUMMARY

An LED driver circuit may includes a buck-mode boost converter that provides a regulated output current and requires only a single connection to each channel of LEDs.

The buck-mode boost converter may include an electronic power switch and a buck-mode boost controller.

The electronic power switch may be configured to controllably deliver current to a buck-mode boost circuit.

The buck-mode boost controller may be configured to control the electronic power switch and to turn the electronic power switch off each time the average current through the electronic power switch during an on cycle of the power switch reaches a desired level. The buck-mode boost controller may include a current regulator that includes an integrator.

The current regulator may be configured to integrate a difference between a reference signal that is representative of the desired level of the average current through the electronic power switch and a detected signal that is representative of the actual current that is being delivered to the buck-mode boost circuit through the electronic power switch. The current regulator may be configured to preserve that integrated value while the electronic power switch is off.

The reference signal to the integrator may not change during each cycle of the power switch.

The current regulator may be configured to deactivate the integrator while the electronic power switch is off.

The current regulator may be configured to disconnect the detected signal from the integrator while the electronic power switch is off.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it is intended to refer to the same or like components or steps.

DETAILED DESCRIPTION OF ILLUSTRATIVE EMBODIMENTS

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

Figure 1:
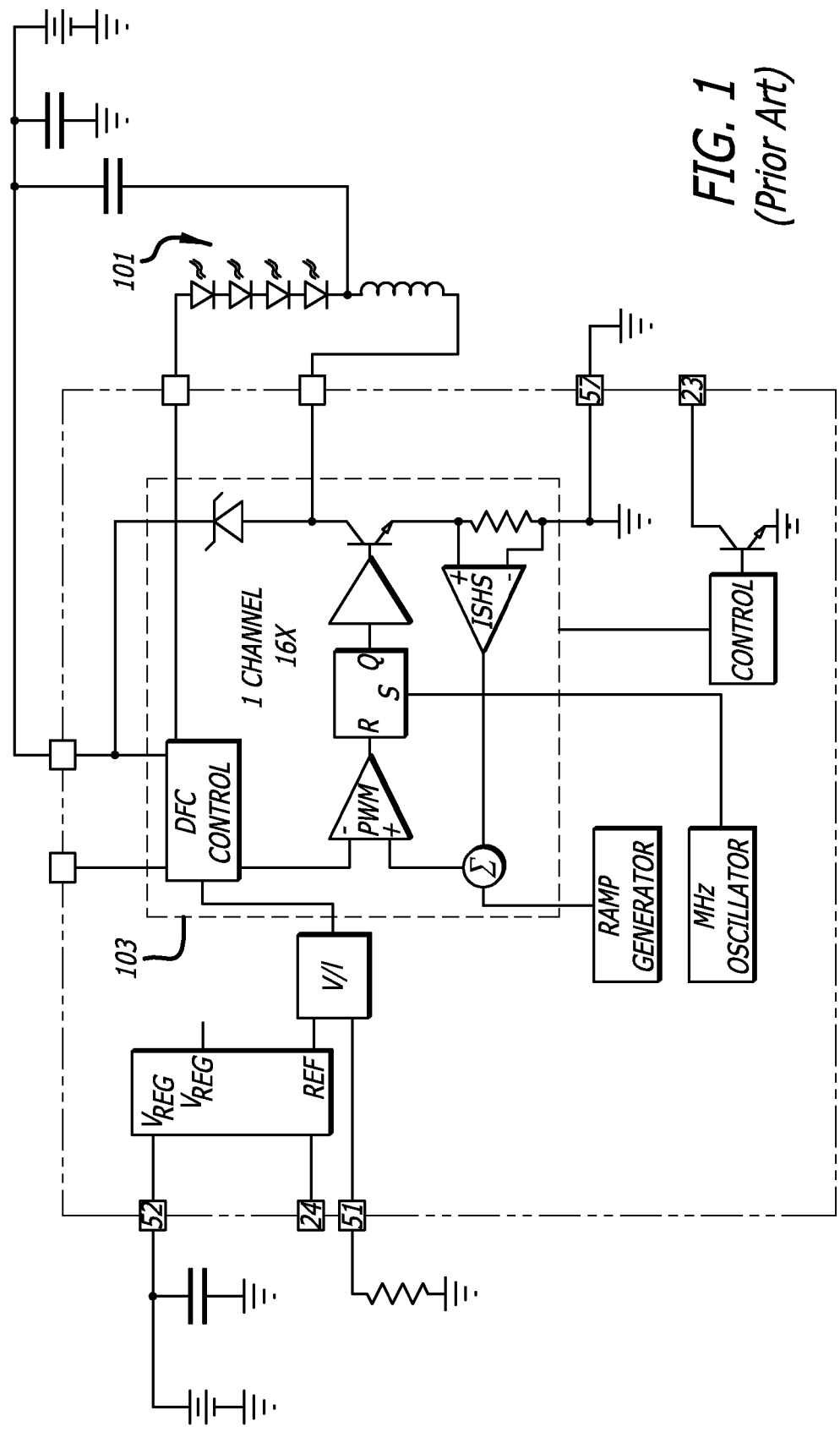
FIG. 1 is a diagram of a prior art LED driver circuit that includes a buck-mode boost converter that provides a regulated output current and that requires two connections to each channel of LEDs.

FIG. 1 is a diagram of a prior art LED driver circuit that includes a buck-mode boost converter that provides a regulated output current and that requires two connections to each channel of LEDs.

As illustrated in FIG. 1, a single channel of LEDs 101 may be connected to a buck-mode boost circuit which, in turn, is driven by a buck-mode boost converter. Details about the operation of this circuit are set forth in the Linear Technology Data Sheet on its 16 Channel Buck Mode LED Driver (part number LT3595) (Document No. LT 0807) (2007), the entire contents of which is incorporated herein by reference.

As indicated in FIG. 1, only one channel of control circuitry is shown in block 103. The actual device separately drives 16 channels of LEDs by replicating this single-channel of control circuitry.

As also reflected in FIG. 1, each channel of LEDs requires two separate connections to the monolithic package. This means that 32 pins of a monolithic package containing this circuitry may need to be dedicated to driving these 16 channels. As indicated above, there may not be any more available pins to drive any additional channels, thus limiting the number of channels which the monolithic package can control.

Figure 2:
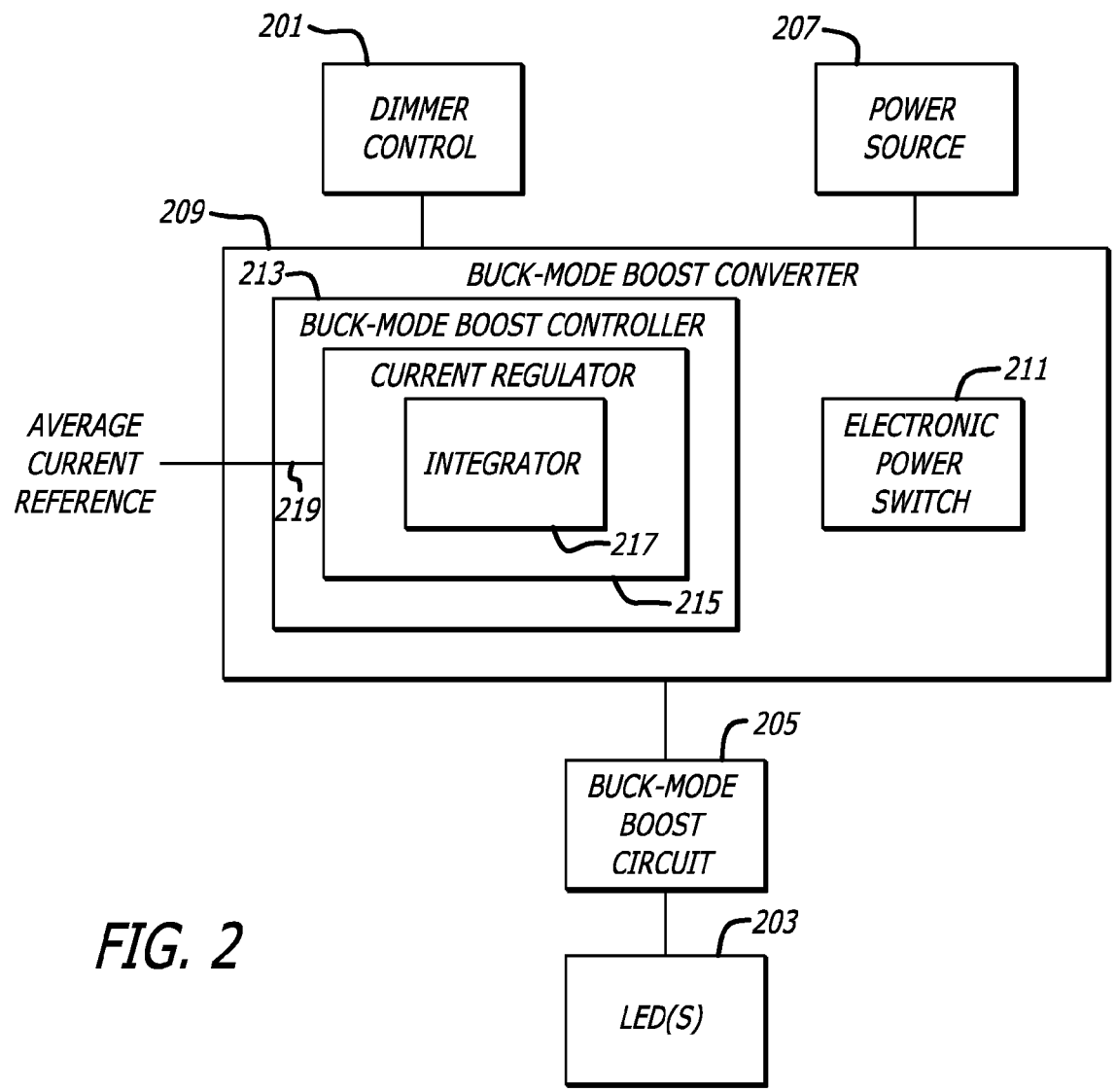
FIG. 2 is a block diagram of an LED driver circuit that includes a buck-mode boost converter that provides a regulated output current and that requires only a single connection to each channel of LEDs.
Figure 3:
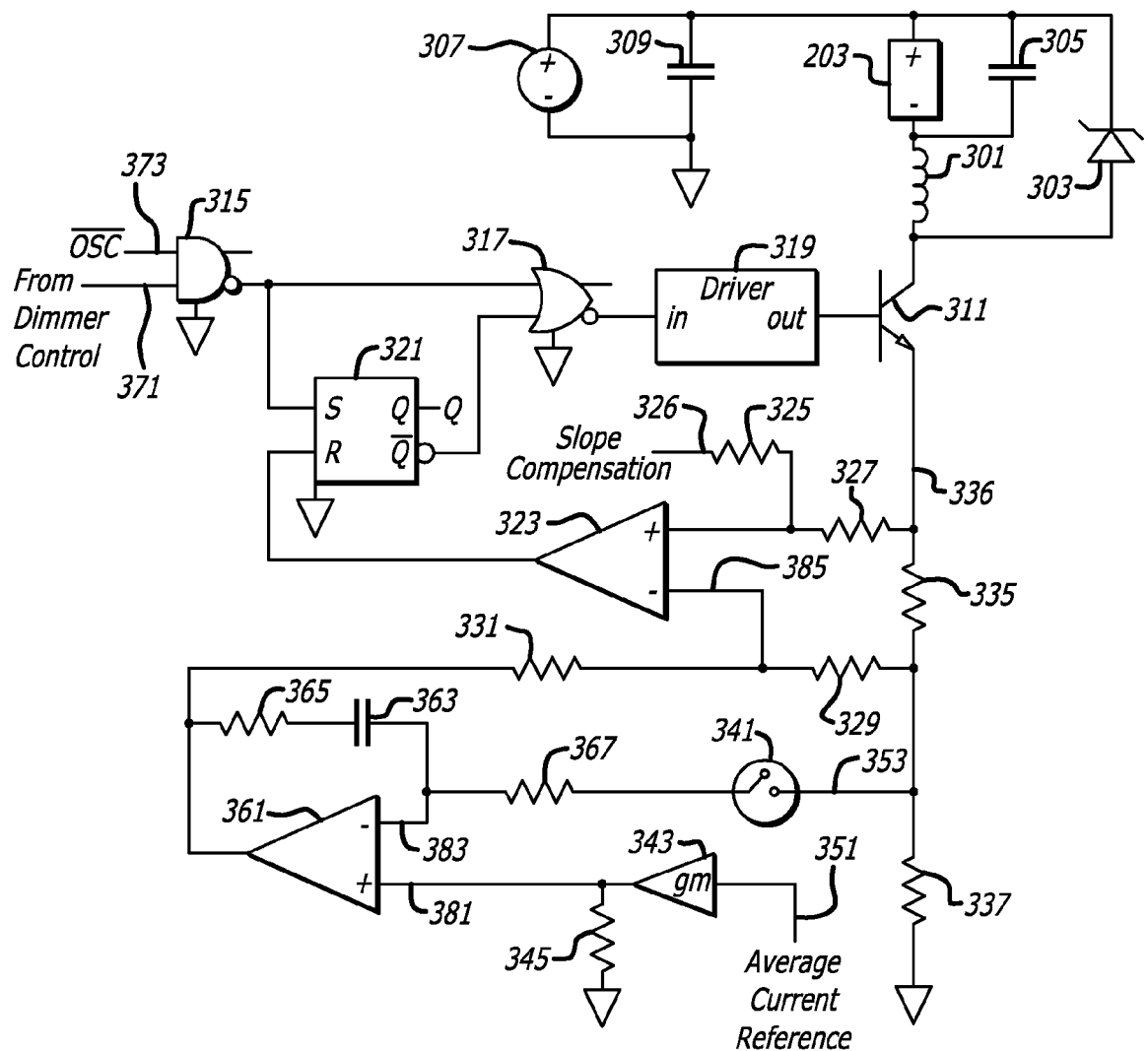
FIG. 3 is a schematic diagram of an LED driver circuit of the type illustrated in FIG. 2.

FIG. 2 is a block diagram of an LED driver circuit that includes a buck-mode boost converter that provides a regulated output current and that requires only a single connection to each channel of LEDs. FIG. 3 is a schematic diagram of an LED driver circuit of the type illustrated in FIG. 2. Circuitry different than that illustrated in FIG. 3 may be used to implement each of the subsystems illustrated in FIG. 2.

As illustrated in FIG. 2, the driver circuit may include a dimmer control 201. The dimmer control 201 may be used to set a dimming level. Any type of control may be used for this purpose, such as a potentiometer or touch plate. The dimmer control 201 may be configured to vary resistance, capacitance, or any other characteristics in response to adjustment by a user.

Circuitry may be included within the dimmer control 201 or elsewhere to generate a periodic pulse that has a width that varies as a function of the dimmer control setting, such as in proportion to that setting. The periodic pulse may have any frequency. For example, it may have a frequency of between 100 and 200 Hz.

The driver circuit may have one or more LEDs 203. The LEDs 203 may be of any type. For example, the LEDs may be configured to generate the same color or different colors. Each LED may provide the same or different levels of light intensity. The LEDs 203 may be connected in series, in parallel, in a combination of these configurations, or in any other configuration. A load other than or in addition to LEDs may be provided.

The driver circuit may include a buck-mode boost circuit 205. The buck-mode boost circuit 205 may be configured to drive the LEDs 203.

As illustrated in FIG. 3, the buck-mode boost circuit 205 may include an inductance 301, a diode 303, and a capacitance 305. The buck-mode boost circuit may include a different set of components or the same set of components arranged differently. A switching circuit other than a buck-mode boost circuit may be used in addition or instead.

As illustrated in FIG. 2, the driver circuit may include a power source 207. The power source 207 may be configured to supply power to the driver circuitry. The power source 207 may be of any type. For example, it may be a power supply configured to convert AC to DC.

As illustrated in FIG. 3, the power source 207 may include a DC power source 307 which may be filtered by a capacitance 309. The power source 207 may be configured to provide separate sources of power for different components in the circuit. For example, the power source 207 may include one source of power for the LEDs 203 and another source of power for other portions of the circuit.

As illustrated in FIG. 2, the driver circuit may include a buck-mode boost converter 209. The buck-mode boost converter 209 may be configured to convert power from the power source 207 into a current that is delivered to a buck-mode boost circuit 205 and that has an average value that is a function of a setting of a dimmer control 201, such as a proportional function.

The buck-mode boost converter may include an electronic power switch 211. The electronic power switch 211 may be configured to controllably deliver power from the power source 207 to the buck-mode boost circuit 205. The electronic power switch 211 may include one or more electronic switches, such as one or more transistors, FETs, and/or MOSFETs. As illustrated in FIG. 3, the electronic power switch 211 may be a single transistor 311. When multiple devices are used instead, they may be connected in any configuration, such as in a push-pull configuration.

As illustrated in FIG. 2, the buck-mode boost converter 209 may include a buck-mode boost controller 213. The buck-mode boost controller 213 may be configured to control the electronic power switch 211 and to turn the electronic power switch off each time the average current through the electronic power switch during an on cycle of the electronic power switch reaches a desired level.

As illustrated in FIG. 3, the buck-mode boost controller 213 may include logic gates 315 and 317, a driver 319, a S-R latch 321, a current comparator 323, and resistances 325, 327, 329, 331, 335, and 337.

As illustrated in FIG. 2, the buck-mode boost controller 213 may include a current regulator 215. The current regulator 215 may be configured to generate a signal that is representative of a desired peak current through the electronic power switch 211.

As illustrated in FIG. 3, the current regulator may include an electronic switch 341, a transconductance amplifier 343, and a resistance 345.

The electronic switch 341 may be of any type. For example, it may include one or more transistors, FETs, and/or MOSFETs. The electronic switch 341 may be configured to open and close synchronously with the transistor 311.

As illustrated in FIG. 2, the current regulator 215 may include an integrator 217. The integrator 217 may be configured to integrate a difference between an average current reference signal 219 that is representative of a desired level of average current through the electronic power switch 211 and a detected signal that is representative of the actual current that is being delivered to the buck-mode boost circuit 205 through the electronic power switch 211.

As illustrated in FIG. 3, the integrator 217 may include an error amplifier 361, a capacitance 363, and resistances 365 and 367. An average current reference signal may be connected at an input 351 to the transconductance amplifier 343. This signal may be a constant DC voltage which maintains this constant DC value throughout the operation of the LED driver circuit. This signal may be provided by an external source or by circuitry internal to the buck-mode boost converter.

A detected signal 353 that is representative of the actual current that is being delivered to the buck-mode boost circuit through the transistor 311 may be developed at the high side of the resistance 337.

The resistances and capacitances which have been identified may have the following values:

| RESISTANCES | |
|---|---|
| Reference Character | Ohms |
| 325 | 11k |
| 327 | 1k |
| 329 | 1k |
| 331 | 15k |
| 335 | .135 |
| 337 | 1 |
| 345 | 500 |
| 365 | 2k |
| 367 | 200k |

| CAPACITANCES | |
|---|---|
| Reference Character | Farads |
| 305 | .1µ |
| 309 | 200µ |
| 363 | 50p |

By way of a further example, the inductance 301 may have a value of 330 µh.

Each noted resistance, capacitance, and inductance may constitute a single component, such as a single resistor, capacitor, or inductor, or multiple components.

The various components which are illustrated in FIG. 3 and which have been identified above may have a broad range of values different from those identified above. For example, the values of these components may vary from those stated above by plus or minus 25, 50, 100, 200, or 500 percent.

A group of the components which have been described may be integrated into a single monolithic package, such as the components which comprised the buck-mode boost converter 209. In other configurations, the buck-mode boost controller 213 may be contained within a single monolithic package, while the electronic power switch 211 may be external to that package. Resistances which are associated with the electronic power switch 211, such as the resistances 335 and 337 in FIG. 3, may or may not be within the single monolithic package. In still further configurations, one or more of the components which are part of the buck-mode boost circuit 205 and/or the dimmer control 201 may also be included within the single monolithic package.

Having now generally described an LED driver circuit in connection with FIG. 2 and an example of components which may be used to implement this circuit in FIG. 3, one mode of operation of the circuit illustrated in FIG. 3 will now be discussed. Although not discussed, there may be other modes of operation which may be dependent upon component values, compositions, and arrangements, as well as input signal characteristics.

As explained above, the dimmer control 201 may be configured to generate a periodic pulse that has a width that varies as a function of the dimmer control setting. As will now be seen, this pulse may control when current is flowing through the LEDs 203. For example, a wider pulse width may cause current to flow through the LEDs 203 for a larger portion of the dimmer control pulse cycle, while a smaller pulse width may cause current to flow through the LEDs 203 for a smaller portion of the dimmer control pulse cycle. Although the LEDs may therefore be flashing at the frequency of the periodic pulses from the dimmer control 201, the frequency of these periodic pulse may be too fast for a human eye to detect. Instead, the LED's may be perceived by a human eye as being steadily illuminated with an intensity that is proportional to the width of the periodic pulses from the dimmer control 201.

As illustrated in FIG. 3, the periodic pulses from the dimmer control may be provided as an input 371 to the logic gate 315. Another input 373 to the logic gate 315 may receive a high frequency clock signal, designated in FIG. 3 as $\overline{OSC}$. This clock signal may be of any frequency, such as between 500 KHz and 2 MHz. The particular frequency which is chosen may be a function of the time constant inherent in the buck-mode boost circuit 205 so as to cause the buck-mode boost circuit 205 to operate in what as know as the continuous mode. This will be explained below.

The logic gates 315 and 317 and the S-R latch 321 may cooperate to generate a signal at the input to the driver 319 which rises in synchronism with the rising edge of each clock pulse during each on period of the periodic pulse from the dimmer control 201 at the input 371. During each off period of the periodic pulse from the dimmer control 201 at the input 371, on the other hand, the input to the driver 319 may be entirely off. The driver 319 may be configured to turn the transistor 311 on and off in substantial synchronism with the input to the driver 319.

Each time the transistor 311 turns on, it may allow current to flow from the inductance 301, through the resistances 335 and 337, and to ground. When the transistor 311 is on and this current is flowing, the diode 303 may be reverse biased, thus causing all of the current that flows through the transistor 311 to also flow through the inductance 301.

The current through the inductance 301 may steadily grow while the transistor 311 is on. Eventually, the current through the inductance 301 and, in turn, the transistor 311 may reach a desired level which, in turn, may cause the current comparator 323 to deliver a reset signal to the S-R latch 321, causing the transistor 311 to turn off. Details concerning how this may happen are discussed below.

After the transistor 311 turns off, current may continue to flow within the inductance 301. During this period, however, the diode 303 may be forward biased, causing the current that continues to flow through the inductance 301 to also flow through the diode 303.

The current which flows through the inductance 301 while the transistor 311 is off may diminish with time. The frequency of the clock signal at the input 373 to the logic gate 315 may be high enough to cause the transistor 311 to turn back on again before the level of current through the inductance 301 falls very substantially. This mode of operation of the buck-mode boost circuit 205 is commonly referred to as the continuous mode. The clock frequency may instead be sufficiently low so as to cause the current in the inductance 301 to fall to zero before the transistor 311 is again turned on. This alternate mode of operation is commonly referred to as the discontinuous mode.

After each periodic pulse from the dimmer control 201 goes low, the clock signals to the transistor 311 may stop, causing the transistor 311 to remain open for the duration of the off time of the periodic pulse from the dimmer control 201. The absence of periodic refreshing pulses of current from the transistor 311 through the inductance 301 may quickly cause the energy in the inductance 301 to completely dissipate. In turn, this may cause the LEDs 203 to turn off and to remain off until the next periodic pulse from the dimmer control 201.

While the LEDs are on, it may be important to ensure that the average current which travels through them remains substantially constant. This may improve the purity of the color which is emitted by the LEDs and/or the efficiency of their operation. The LED driver circuitry which is illustrated in FIGS. 2 and 3 may help accomplish this. How it may do so is now explained.

Figure 4A:
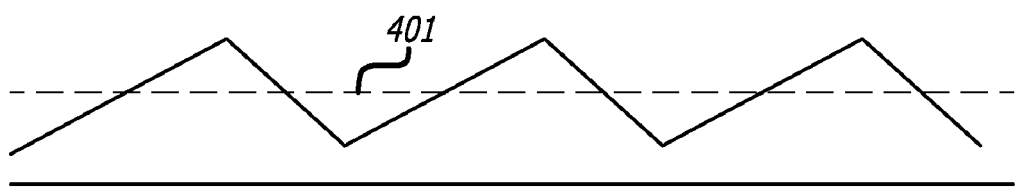
FIG. 4(a) illustrates current which may flow through an inductance in FIG. 3 while the LEDs are being driven.

FIG. 4(a) illustrates current which may flow through the inductance 301 while the periodic pulse from the dimmer control 201 is high. This illustrated current is comparable to the current which flows through the LEDs 203. The only difference may be smoothening caused by the capacitance 305.

Figure 4B:
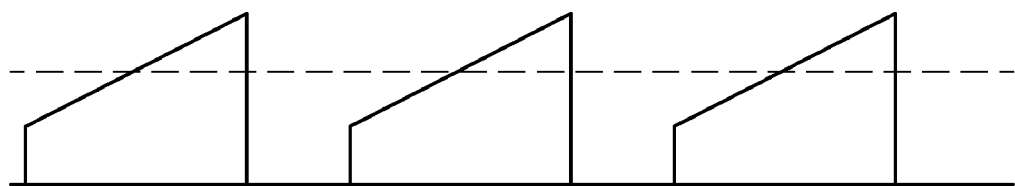
FIG. 4(b) illustrates current which may flow through a power transistor in FIG. 3 while the LEDs are being driven.

FIG. 4(b) illustrates current which may flow through the transistor 311 in FIG. 3 while the LEDs are being driven.

Figure 4C:
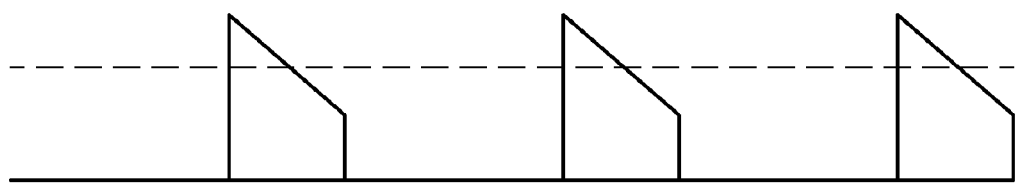
FIG. 4(c) illustrates current which may flow through a diode in FIG. while the LEDs are being driven.

FIG. 4(c) illustrates current which may flow through the diode 303 in FIG. 3 while the LEDs are being driven.

As illustrated in FIGS. 4(a) and 4(b), the current which travels through the inductance 301 and the transistor 311 may change as a function of time in an approximately linear manner. Because of this, the average amount of current which travels through the transistor 311 may be proportional to the average amount of current which travels through the inductance 301 and, in turn, through the LEDs 203. Thus, the average amount of current which travels through the LEDs 203 while they are on may be regulated by regulating the average amount of current which travels through the transistor 311 while it is on. The discussion below explains how the circuit illustrated in FIG. 3 accomplishes this regulation.

As indicated above, an average current reference signal may be delivered at the input 351 to the transconductance amplifier 343. This may cause a current proportional to the average current reference signal to be delivered through the resistance 345 and, in turn, a proportional voltage to be delivered to a positive input 381 to the error amplifier 361. The average current reference signal may be representative of the desired level of average current through the transistor 311.

A detected signal 353 that is representative of the actual current that is being delivered to the buck-mode boost circuit by the transistor 311 may be developed at the high side of the resistance 337. This detected signal 353, in turn, may be controllably delivered by the electronic switch 341 through the resistance 367 to a negative input 383 to the error amplifier 361. The resulting error may be integrated by the capacitance 363 and, after scaling, delivered to a negative input 385 of the current comparator 323.

When the actual current through the transistor 311 is less than the average current, the capacitance 363 may integrate this positive error and the output of the error amplifier 361 may rise. When the actual current through the transistor 311 is greater than the desired average current, on the other hand, the capacitance may integrate this negative error and the output from the error amplifier 361 may fall.

The output from the error amplifier 361 may be compared by the current comparator 323 to another detected signal 336 at the high side of the resistance 335 that is representative of the actual current through the transistor 311. When the actual current reaches a scaled version of the output from the error amplifier 361, the current comparator 323 may generate a signal which resets the S-R latch 321 and, in turn, turns the transistor 311 off.

The net effect of this servo loop may be to cause the transistor 311 to turn off each time the current through it reaches a level dictated by the output of the error amplifier 361.

The output from the error amplifier 361 may ultimately reach a substantially steady state. This steady state my be representative of a peak desired current which, when reached, causes the average current through the transistor 311 to be approximately equal to the desired average current, as dictated by the average current reference signal at the input 351 of the transconductance amplifier 343. This may be due to the effect of the integration in the current regulator, as now explained.

A dotted horizontal line 401 in FIG. 4(*a*) illustrates a desired average current. At the beginning of each clock cycle, the actual current may be less than the desired average current. This may cause the output of the error amplifier 361 to rise. Later during a clock cycle, the current through the transistor 311 may exceed the desired average level illustrated by the dotted line 401, causing the output of the error amplifier 361 to fall.

If the average current through the transistor 311 during a particular clock cycle is less than the desired level by the end of that clock cycle, the output of the error amplifier 361 may exhibit a net gain by the end of the on-period of the transistor 311. In turn, this may cause the transistor 311 to remain on longer during the next cycle, increasing the average current through it during that cycle.

On the other hand, if the average current through the transistor 311 during a particular clock cycle is more than the desired level by the end of that clock cycle, the output of the error amplifier 361 may exhibit a net loss by the end of the on-period of the transistor 311. In turn, this may cause the transistor 311 to turn off sooner during the next cycle, decreasing the average current through it during that cycle.

Ultimately, this servo loop may cause the average current through the transistor 311 during the on period of a clock cycle to be approximately equal to the desired level by the end of that clock cycle. When this happens, the output of the error amplifier 361 may not exhibit any net gain or loss by the end of each cycle, i.e., it may have reached a stead state condition.

It may take several clock cycles for the output of the error amplifier to reach this steady state condition. During this transition, the average current through the LEDs 203 may not be at the desired level. The values of the capacitance 362 and the resistances 365 and 367 may be selected to control the rate at which the output reaches steady state, based on needed speed and stability considerations. A slope compensation signal may also be provided at an input 326 to help regulate the stability of this servo loop.

During each off period of the transistor 311, the integrated value at the output of the error amplifier 361 may be preserved. To accomplish this, the current regulator 215 may be configured to deactivate the integrator 217 while the electronic power switch 211 is off. To accomplish this, the current regulator may be configured to disconnect the detected current signal from the integrator while the electronic power switch is off.

The electronic switch 341 may be configured to perform these functions, as illustrated in FIG. 3. As indicated above, the electronic switch 341 may be configured to open and close synchronously with the transistor 311. When the electronic switch 341 is open, there may be no path for current to flow at the negative input 383 to the error amplifier 361. This may effectively deactivate the integrator and insure that its integrated value is preserved during each off period.

The net effect of the driver circuits which have now been described may be to regulate the average current which flows through the LEDs 203 when they are on, without requiring multiple connections between the buck-mode boost circuit which drives these LEDs and the buck-mode boost converter. Instead, only a single connection may be needed.

Several instances of the buck-mode boost converters and/or the buck-mode boost controllers which are illustrated in FIGS. 2 and 3 may be packaged within a single monolithic package, thus permitting the intensity of multiple channels of LEDs to be individually controlled by a single monolithic package. Because only a single connection through each LED channel may be required, the number of channels which may be controlled by the single monolithic package having a limited number of pins may be maximized.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

For example, techniques other than integration may be used to determine whether the average current through the electronic power switch 211 is equal to a desired amount. In an alternate embodiment, for example, a phase-lock loop may be used to determine the midpoint of the current through the electronic power switch 211 during each on cycle of the electronic power switch 211. This midpoint may then be representative of the average current during each on cycle of the electronic power switch 211.

In another embodiment, the initial and ending value of the current through the electronic power switch 211 may be sampled during each on cycle and added together using an operational amplifier adder.

In a still further embodiment, the sampled values may be stored in two capacitances having substantially the same value. The two capacitances may then be connected to produce an average of the two sampled values.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The phrase "means for" when used in a claim is intended to and should be interpreted to embrace the corresponding structures and materials that have been described and their equivalents. Similarly, the phrase "step for" when used in a claim embraces the corresponding acts that have been described and their equivalents. The absence of these phrases means that the claim is not intended to and should not be interpreted to be limited to any of the corresponding structures, materials, or acts or to their equivalents.

Nothing that has been stated or illustrated is intended or should be interpreted to cause a dedication of any component, step, feature, object, benefit, advantage, or equivalent to the public, regardless of whether it is recited in the claims.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

The invention claimed is:

1. A buck-mode boost converter comprising:
an electronic power switch configured to controllably deliver current to a buck-mode boost circuit; and
a buck-mode boost controller configured to control the electronic power switch and to turn the electronic power switch off each time an average current through the electronic power switch during an on cycle of the electronic power switch reaches a desired level, the buck-mode boost controller including a current regulator and an integrator, the current regulator being configured to:
integrate a difference between a reference signal that is representative of the desired level of the average current through the electronic power switch and a detected signal that is representative of an actual current that is being delivered to the buck-mode boost circuit through the electronic power switch; and
preserve that integrated value while the electronic power switch is off,
wherein:
the reference signal to the integrator does not change during each cycle of the electronic power switch;
the current regulator is configured to deactivate the integrator while the electronic power switch is off; or
the current regulator is configured to disconnect the detected signal from the integrator while the electronic power switch is off.

2. The buck-mode boost converter of claim 1 wherein the reference signal to the integrator does not change during each cycle of the electronic power switch.

3. The buck-mode boost converter of claim 2 wherein the current regulator is configured to deactivate the integrator while the electronic power switch is off.

4. The buck-mode boost converter of claim 3 wherein the current regulator is configured to disconnect the detected signal from the integrator while the electronic power switch is off.

5. The buck-mode boost converter of claim 1 wherein the current regulator is configured to deactivate the integrator while the electronic power switch is off.

6. The buck-mode boost converter of claim 1 wherein the current regulator is configured to disconnect the detected signal from the integrator while the electronic power switch is off.

7. The buck-mode boost converter of claim 1 wherein the buck-mode boost controller is configured to turn the electronic power switch off each time the average current through the electronic power switch reaches the desired level without receiving a signal that tracks current that is delivered by the buck-mode boost circuit to a load.

8. The buck-mode boost converter of claim 1 wherein the current regulator is configured to generate a signal that is representative of a desired peak current through the electronic power switch.

9. The buck-mode boost converter of claim 1 wherein the current regulator includes a second electronic switch that is configured to switch synchronously with the electronic power switch.

10. The buck-mode boost converter of claim 9 wherein the second electronic switch is configured to gate a signal to the integrator that is representative of a current through the electronic power switch.

11. The buck-mode boost converter of claim 1 wherein the buck-mode boost controller is configured to receive a periodic pulse that has a width that varies as a function of the desired average current through the buck-mode boost circuit power switch and to cause the electronic power switch to deliver that desired average current.

12. The buck-mode boost converter of claim 1 comprising a plurality of electronic power switches and a plurality of buck-mode boost controllers, each configured as set forth in claim 1 to controllably deliver current to a different buck-mode boost circuit, the buck-mode boost converter being packaged in a single monolithic package which has only a single pin for each of the buck-mode boost circuits.

13. A buck-mode boost controller configured to control an electronic power switch and to turn the electronic power switch off each time an average current through the electronic power switch reaches a desired level, the buck-mode boost controller including a current regulator and an integrator, the current regulator being configured to:
integrate a difference between a reference signal that is representative of the desired level of the average current through the electronic power switch and a detected signal that is representative of an actual current that is being delivered to a buck-mode boost circuit through the electronic power switch; and
preserve that integrated value while the electronic power switch is off,
wherein:
the reference signal to the integrator does not change during each cycle of the electronic power switch ;
the current regulator is configured to deactivate the integrator while the electronic power switch is off; or
the current regulator is configured to disconnect the detected signal from the integrator while the electronic power switch is off.

14. The buck-mode boost converter of claim 13 wherein the reference signal to the integrator does not change during each cycle of the electronic power switch.

15. The buck-mode boost converter of claim 14 wherein the current regulator is configured to deactivate the integrator while the electronic power switch is off.

16. The buck-mode boost converter of claim 15 wherein the current regulator is configured to disconnect the detected signal from the integrator while the electronic power switch is off.

17. The buck-mode boost converter of claim 13 wherein the current regulator is configured to deactivate the integrator while the electronic power switch is off.

18. The buck-mode boost converter of claim 13 wherein the current regulator is configured to disconnect the detected signal from the integrator while the electronic power switch is off.

19. The buck-mode boost converter of claim 13 wherein the buck-mode boost controller is configured to turn the electronic power switch off each time the average current through the electronic power switch reaches the desired level without receiving a signal that tracks current that is delivered by the buck-mode boost circuit to a load.

20. The buck-mode boost converter of claim 13 wherein the current regulator is configured to generate a signal that is representative of a desired peak current through the electronic power switch.

21. The buck-mode boost converter of claim 13 wherein the current regulator includes a second electronic switch that is configured to switch synchronously with the electronic power switch.

22. The buck-mode boost converter of claim 21 wherein the second electronic switch is configured to gate a signal to the integrator that is representative of a current through the electronic power switch.

23. The buck-mode boost converter of claim 13 wherein the buck-mode boost controller is configured to receive a periodic pulse that has a width that varies as a function of the desired average current through the power switch and to cause the electronic power switch to deliver that desired average current.

24. An LED light driver circuit comprising:
a buck-mode boost circuit configured to drive one or more LEDs; an electronic power switch configured to controllably deliver current to the buck-mode boost circuit; and
a buck-mode boost controller configured to control the electronic power switch and to turn the electronic power switch off each time an average current through the electronic power switch during an on cycle of the electronic power switch reaches a desired level, the buck-mode boost controller including a current regulator and an integrator, the current regulator being configured to:
integrate a difference between a reference signal that is representative of the desired level of an average current through the electronic power switch and a detected signal that is representative of the actual current that is being delivered to the buck-mode boost circuit through the electronic power switch; and
preserve that integrated value while the electronic power switch is off,
wherein:
the reference signal to the integrator does not change during each cycle of the electronic power switch;
the current regulator is configured to deactivate the integrator while the electronic power switch is off; or
the current regulator is configured to disconnect the detected signal from the integrator while the electronic power switch is off.

\* \* \* \* \*